(12) United States Patent
Tao et al.

(10) Patent No.: US 8,414,796 B2
(45) Date of Patent: Apr. 9, 2013

(54) NANO-YAG:CE PHOSPHOR COMPOSITIONS AND THEIR METHODS OF PREPARATION

(75) Inventors: Dejie Tao, Fremont, CA (US); Yi-Qun Li, Danville, CA (US); Shifan Cheng, Dublin, CA (US)

(73) Assignee: Intematix Corporation, Fremont, CA (US)

( * ) Notice: Subject to any disclaimer, the term of this patent is extended or adjusted under 35 U.S.C. 154(b) by 0 days.

(21) Appl. No.: 13/417,645

(22) Filed: Mar. 12, 2012

(65) Prior Publication Data

US 2012/0175557 A1 Jul. 12, 2012

Related U.S. Application Data

(63) Continuation of application No. 11/975,356, filed on Oct. 18, 2007, now Pat. No. 8,133,461.

(60) Provisional application No. 60/853,382, filed on Oct. 20, 2006.

(51) Int. Cl.
*C09K 11/08* (2006.01)

(52) U.S. Cl. .............................................. 252/301.4 H

(58) Field of Classification Search ........................ None
See application file for complete search history.

(56) References Cited

U.S. PATENT DOCUMENTS

| 5,037,577 | A | * | 8/1991 | Yamanoi et al. | ....... 252/301.4 R |
|---|---|---|---|---|---|
| 5,600,202 | A | | 2/1997 | Yamada et al. | |
| 5,998,925 | A | | 12/1999 | Shimizu et al. | |
| 6,013,199 | A | | 1/2000 | McFarland et al. | |
| 6,069,440 | A | | 5/2000 | Shimizu et al. | |
| 6,245,259 | B1 | * | 6/2001 | Hohn et al. | .............. 252/301.36 |
| 6,409,938 | B1 | | 6/2002 | Comanzo | |
| 6,669,866 | B1 | | 12/2003 | Kummer et al. | |
| 6,869,544 | B2 | * | 3/2005 | Chen et al. | .............. 252/301.4 R |

(Continued)

FOREIGN PATENT DOCUMENTS

| CN | 1254747 A | 5/2000 |
|---|---|---|
| DE | 19934126 A1 | 1/2001 |

(Continued)

OTHER PUBLICATIONS

Fernandez et al, highly porous yttrium aluminum garnet particles synthesised by a gel supported precipitation process, 2003, journal of materials science, 38, pp. 2331-2335.*

(Continued)

*Primary Examiner* — Melvin C Mayes
*Assistant Examiner* — Stefanie Cohen
(74) *Attorney, Agent, or Firm* — David H. Jaffer; Pillsbury Winthrop Shaw Pittman LLP

(57) ABSTRACT

Disclosed herein are cerium doped, garnet phosphors emitting in the yellow region of the spectrum, and having the general formula $(Y,A)_3(Al,B)_5(O,C)_{12}:Ce^{3+}$, where A is Tb, Gd, Sm, La, Sr, Ba, Ca, and/or Mg, and substitutes for Y, B is Si, Ge, B, P, and/or Ga, and substitutes for Al, and C is F, Cl, N, and/or S, where C substitutes for O. Relative to a solid-state-reaction method, the instant co-precipitation methods provide a more homogeneous mixing environment to enhance the distribution of the $Ce^{3+}$ activator in the YAG matrix. Such a uniform distribution has the benefit of an increased emission intensity. The primary particle size of the as-prepared phosphor is about 200 nm, with a narrow distribution.

13 Claims, 9 Drawing Sheets

U.S. PATENT DOCUMENTS

| | | | |
|---|---|---|---|
| 7,029,602 | B2 | 4/2006 | Oshio |
| 7,267,786 | B2 * | 9/2007 | Fiedler et al. ............ 252/301.4 F |
| 7,521,862 | B2 | 4/2009 | Mueller et al. |
| 7,573,072 | B2 | 8/2009 | Setlur et al. |
| 7,575,697 | B2 | 8/2009 | Li et al. |
| 7,753,553 | B2 | 7/2010 | Justel et al. |
| 2003/0001495 | A1 | 1/2003 | Liu et al. |
| 2003/0203205 | A1 | 10/2003 | Bi et al. |
| 2004/0000862 | A1 | 1/2004 | Setlur et al. |
| 2004/0173807 | A1 * | 9/2004 | Tian et al. ........................ 257/98 |
| 2004/0256974 | A1 | 12/2004 | Mueller-Mach et al. |
| 2005/0092408 | A1 | 5/2005 | Lauf et al. |
| 2005/0093442 | A1 | 5/2005 | Setlur et al. |
| 2005/0141240 | A1 | 6/2005 | Hata et al. |
| 2005/0145868 | A1 | 7/2005 | Kummer et al. |
| 2005/0242329 | A1 | 11/2005 | Fiedler et al. |
| 2006/0083694 | A1 | 4/2006 | Kodas et al. |
| 2006/0158097 | A1 | 7/2006 | Juestel et al. |
| 2006/0164005 | A1 | 7/2006 | Sun |
| 2008/0018235 | A1 | 1/2008 | Wang et al. |
| 2008/0138268 | A1 | 6/2008 | Tao et al. |
| 2008/0203892 | A1 | 8/2008 | Schmidt et al. |
| 2008/0231171 | A1 | 9/2008 | Schmidt et al. |
| 2009/0072710 | A1 | 3/2009 | Schmidt et al. |

FOREIGN PATENT DOCUMENTS

| | | |
|---|---|---|
| EP | 1378556 A2 | 1/2004 |
| EP | 1589090 A2 | 10/2005 |
| WO | 2004/084261 A2 | 9/2004 |
| WO | WO 2006/129559 | 5/2006 |

OTHER PUBLICATIONS

Baccaro, S. et al., Influence of Si-codoping on YAG:Ce scintillation characteristics, IEEE Transactions on Nuclear Science, Aug. 2005, pp. 1105-1108, vol. 52, No. 4.

Fernandez, A. et al., Highly porous yttrium aluminum garnet (YAG) particles synthesized by a gel supported precipitation (GSP) process, Journal of Materials Science, Jan. 2003, pp. 2331-2335, vol. 38.

Kang et al, YAG:Ce phosphor particles prepared by ultrasonic spray pyrolysis, Materials Research Bulletin, 2000, pp. 789-798.

Kim et al., Synthesis and Luminescent Characterization of Zinc Thiogallat, Journal of the European Ceramic Society, Mar. 26, 2007, pp. 3667-3670, vol. 27.

Wu, J. L. et al., Spectral properties of various cerium doped garnet phosphors for application in white GaN-based LEDs, Materials Research Society Symposium Proceedings, Jan. 1, 2001, pp. GG11.8.1-GG11.8.6, vol. 658.

Li, H.-L. et al., Fabrication of Transparent Cerium-Doped Lutetium Aluminum Garnet Ceramics by Co-Precipitation Routes, Journal of the American Ceramic Society, 2006, pp. 2356-2358, vol. 89, No. 7.

Kuru, Y. et al., Yttrium Aluminum Garnet as a Scavenger for Ca and Si, Journal of the American Ceramic Society, 2008, pp. 3663-3667, vol. 91, No. 11.

International Search Report and Written Opinion issued Feb. 26, 2008 for PCT/US2007/022360.

* cited by examiner

US 8,414,796 B2

NANO-YAG:CE PHOSPHOR COMPOSITIONS AND THEIR METHODS OF PREPARATION

CLAIM OF PRIORITY

This application is a continuation of U.S. patent application Ser. No. 11/975,356, filed Oct. 18, 2007, now U.S. Pat. No. 8,133,461, entitled "NANO-YAG:Ce PHOSPHOR COMPOSITIONS AND THEIR METHODS OF PREPARATION," by Dejie Tao et al., which claims priority to U.S. Patent Application No. 60/853,382, filed Oct. 20, 2006, entitled "NANO YAG:CE PHOSPHORS AND THE METHOD OF PREPARING THE SAME," by Dejie Tao et al., both of which applications are incorporated herein in their entirety.

BACKGROUND OF THE INVENTION

1. Field of the Invention

Embodiments of the present invention are directed to cerium-doped, garnet-based phosphors prepared by liquid mixing methods.

2. Description of the Related Art

The yttrium aluminate garnet phosphor known as YAG:Ce (when activated by trivalent cerium) is a well-known phosphor used in the so-called "white LED" commercial market. In comparison with phosphors based on silicates, sulphates, nitridosilicates, and oxonitridosilicates, YAG has a relatively high absorption efficiency of blue colored excitation radiation, high quantum efficiency (QE greater than about 90 percent), good stability in a high temperature and high humidity environment, and a broad emission spectrum. However, YAG's emission intensity decreases when the wavelength of the excitation radiation is reduced to a level below about 460 nm.

In the art, YAG phosphors are commonly prepared at high temperatures (greater than about 1600° C.) via a solid-state reaction method. Due to insufficient mixing and the low reactivity of the raw materials, several intermediate phases such as $Y_4Al_2O_9$ (YAM) and $YAlO_3$ (YAP) may be easily incorporated into the product compositions. Additionally, the particle size(s) of the resultant phosphor is not uniform, and typically displays a broad distribution ranges from about 1 to more than 10 micrometers when, for example, the average size (D50) in the distribution is located at about 5 micrometers.

In comparison with the solid-state-reaction method, a co-precipitation method has the advantages of preparing a substantially pure YAG phase at relatively low temperatures with a narrow distribution of the particle size. In the meantime, the luminescent properties of the co-precipitated phosphors are as good as, or perhaps even better, than the properties of those phosphors prepared by a solid-state-reaction technique.

What is needed is an improvement of YAG's emission intensity when the emission peak is centered at wavelength of from about 540 nm to 560 nm when excited by a blue diode having an emission peak wavelength at about 445 nm to 455 nm. This will produce high brightness white LEDs. To further improve the external conversion emission from a blue diode to a white diode, the scattering loss needs to be further minimized by reducing the phosphor particle size below the emission wavelength, preferably less than 400 nm.

SUMMARY OF THE INVENTION

Embodiments of the present invention are directed to a cerium-doped, garnet-based phosphor having the formula:

; where

A is selected from the group consisting of Tb, Gd, Sm, La, Sr, Ba, Ca, and where A substitutes for Y from in amounts ranging from about 0.1 to 100 percent;

B is selected from the group consisting of Si, Ge, B, P, and Ga, and where B substitutes for Al in amounts ranging from about 0.1 to 100 percent; and C is selected from the group consisting of F, Cl, N, and S, and where C substitutes for O in amounts ranging from about 0.1 to 100 percent.

These cerium-doped, garnet-based phosphors are produced by a co-precipitation method, which provides a number of benefits. One benefit is that the method allows for a halogen to be incorporated into the crystal lattice of the phosphor, which leads to enhanced emission intensities, and the ability to control the wavelength of the emission. Co-precipitation offers a more homogeneous mixing environment to enhance the distribution of other components as well, such as the $Ce^{3+}$ activator in the YAG matrix.

The instant co-precipitation methods provide for beneficial control over particle size as well. According to the present embodiments, the particle size distribution ranges from about 10 nm to about 1 μm. In an alternative embodiment, the D50 average particle size ranges from about 200 nm to about 700 nm.

In addition to the parameters of a co-precipitation method of preparation which were investigated (e.g., inclusion of F in the lattice, and particle size control), sintering temperature and atmosphere were treated as variables. Increasing the sintering temperature was found to increase crystallinity. Reducing atmospheres enhanced emission intensity relative to inert atmospheres.

DETAILED DESCRIPTION OF THE INVENTION

Figure 1:
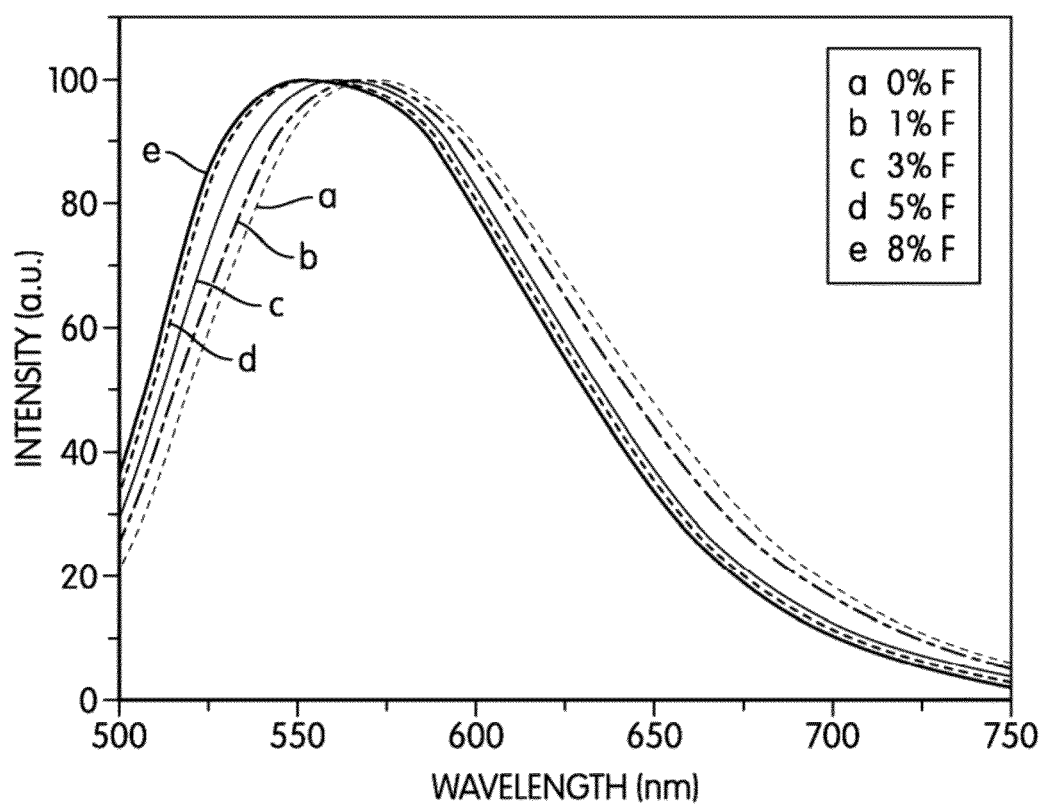
FIG. 1 is a normalized emission spectra of $Ce:Y_3Al_5(O,F)_{12}$ with concentrations of fluorine (F) ranging from about 1 to about 8 percent substitution for oxygen, this phosphor demonstrating a peak wavelength shift to shorter wavelengths as the concentration of the fluorine is increased.

Disclosed herein are cerium doped, garnet phosphors emitting in the yellow region of the spectrum. These phosphors may be described by the general formula $(Y,A)_3(Al,B)_5(O,C)_{12}:Ce^{3+}$, where A is Tb, Gd, Sm, La, Sr, Ba, Ca, and/or Mg, and where A substitutes for Y from in amounts ranging from about 0.1 to 100 percent; B is Si, Ge, B, P, and/or Ga, where B substitutes for Al in amounts ranging from about 0.1 to 100 percent; and C is F, Cl, N, and/or S, where C substitutes for O in amounts ranging from about 0.1 to 100 percent.

In an alternative embodiment, the yellow-emitting, cerium-doped garnet phosphor is described by the formula $Y_3(Al_{1-x}Si_x)_5(O_{1-y}C_y)_{12}:Ce^{3+}$, where C has the same meaning as above, x ranges from about 0.001 to about 0.2, and y is ranges from about 0.001 to about 0.2.

In an alternative embodiment, the yellow-emitting, cerium-doped garnet phosphor is luminescent when excited by radiation having a peak wavelength ranging from about 445 nm to about 460 nm, the peak wavelength range of the yellow, emitted light ranging from about 540 to 560 nm, and where the elements in the phosphor comprise yttrium, aluminum, silicon, oxygen and fluorine.

In an alternative embodiment, the yellow-emitting, cerium-doped garnet phosphor is luminescent when excited by radiation having a peak wavelength ranging from about 445 nm to about 460 nm, the peak wavelength range of the yellow, emitted light ranging from about 540 to 560 nm, and where the particle size distribution ranges from about 10 nm to about 1 μm.

In an alternative embodiment, the yellow-emitting, cerium-doped garnet phosphor is luminescent when excited by radiation having a peak wavelength ranging from about 445 nm to about 460 nm, the peak wavelength range of the yellow, emitted light ranging from about 540 to 560 nm, and where the D50 average particle size ranges from about 200 nm to about 700 nm.

In an alternative embodiment, the yellow-emitting, cerium-doped garnet phosphor is luminescent when excited by radiation having a peak wavelength ranging from about 445 nm to about 460 nm, the peak wavelength range of the yellow, emitted light ranging from about 540 to 560 nm, and where the phosphor comprises a compound represented by the formula $Y_3(Al_{1-x}Si_x)_5(O_{1-y}C_y)_{12}:Ce^{3+}$, where x ranges from about 0.001 to about 0.2, y ranges from about 0.001 to about 0.2, and the particle size distribution ranges from about 10 nm to about 1 μm.

Methods of producing the instant phosphors comprise the following steps:

1) desired amounts of $Ce(NO_3)_3 \cdot 6H_2O$, $Y(NO_3)_3 \cdot 6H_2O$, $Al(NO_3)_3 \cdot 9H_2O$ and either of the starting materials $NH_4X$, $AlX_3$, and/or $YX_3$ (where X is a halogen such as F or Cl) are weighed, and then dissolved in de-ionized water;

2) adding the solution from step 1) to an ammonia solution in a dropwise manner;

3) aging the solution of step 2) for about 1 hour, and then filtering and washing the resultant precipitant with distilled water;

4) drying the precipitate of step 3) at about 150° C. for 6 about hours; and 5) cooling and gently milling the dried precipitate of step 4), transferring this product to an alumina crucible, and sintering the milled product at about 1100° C. to 1500° C. in a reducing atmosphere.

In alternative embodiments, the method further includes a step of adding $(CH_3O)_4Si$ to the solution resulting from step 1). Furthermore, the A containing starting materials do not have to be the nitrates in the example above, and the A containing starting materials may also be oxides, hydroxides, carbonates, and sulfates, and the like.

In an alternative procedure, a sol-gel like polymerization step may be included during the liquid step(s) with the addition of a silicon-containing monomer. When the method is used to produce a phosphor having the formula $Ce:Y_3(Al_{1-x}Si_x)_5O_{12}$, the method comprises the following steps:

1) dissolving desired amounts of $Ce(NO_3)_3 \cdot 6H_2O$, $Y(NO_3)_3 \cdot 6H_2O$, $Al(NO_3)_3 \cdot 9H_2O$ in de-ionized water;

2) adding $(CH_3O)_4Si$ to the solution resulting from step 1);

3) adding the solution from step 2) to an ammonia solution in a dropwise manner;

4) aging the solution of step 3) for about 1 hour, and then filtering and washing the resultant precipitant with distilled water;

5) drying the precipitate of step 4) at about 150° C. for 6 about hours; and 6) cooling and gently milling the dried precipitate of step 4), transferring this product to an alumina crucible, and sintering the milled product at about 1100° C. to 1500° C. in a reducing atmosphere.

This latter method may also include a step of adding a halogen containing compound to the solution resulting from step 1.

The following experiments describe the results of experiments carried out by the present inventors. The first set of experiments is directed toward the substitution of a halogen such as F or Cl on oxygen lattice sites in a crystal having the formula $Ce:Y_3Al_5(O,F)$, including the effect of using different fluorine-containing compounds as starting materials. The next set of experiments investigates the effect of replacing Al with Si in these aluminate-based garnets, specifically in the compound $Ce:Y_3(Al_{1-x}Si_x)_5O_{12}$. The final three sections of this disclosure discuss the effects of sintering temperature have on the optical properties and morphology of the phosphors, including particle size.

Fluorine Substitution for Oxygen in $Ce:Y_3Al_5(O,F)_{12}$

Powder samples of phosphors having with the general formula $(Ce_xY_{1-x})_3Al_5O_{12}$ were prepared using the co-precipitation method described above. The starting materials used in the preparation of this phosphor were powders having a purity greater than about 99.9 percent. The starting materials were $Ce(NO_3)_3 \cdot 6H_2O$, $Y(NO_3)_3 \cdot 6H_2O$ and $Al(NO_3)_3 \cdot 9H_2O$ and $NH_4X$, $AlX_3$ and/or $YX_3$, where X is a halogen such as fluorine (F) or chlorine (Cl). The first of the two procedures described above was used to produce the $(Ce_xY_{1-x})_3Al_5O_{12}$ phosphor.

The crystal structure and morphology of the $Ce^{3+}$:YAG phosphor particles produced by the above described experiment were investigated by x-ray diffraction with a Rigaku MiniFlex X-ray diffractometer, using using Cu Kα radiation, and a scanning electron microscopy (JEOL JSM-6330F field emission scanning electron microscope). The excitation spectra of Ce:YAG phosphor particles were measured using a SHIMADZU RF-1501 spectrofluorophotometer, which utilizes a xenon arc lamp as an excitation source. The photoluminescent spectra of the Ce3+:YAG phosphor particle products were measured using an Ocean Optics USB2000 spectrometer, the phosphors excited by a 450 nm LED. In the present experiments, fluorine was added to the phosphor precursors in the liquid phase that occurs before calcination.

Figure 2:
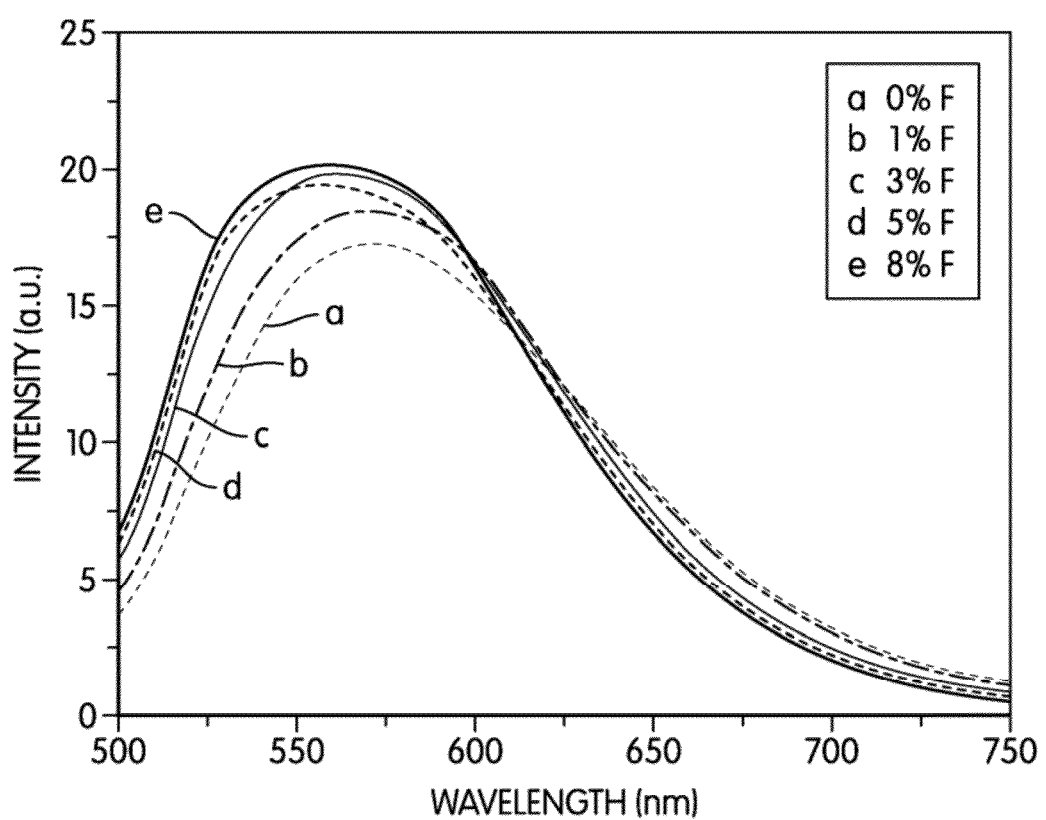
FIG. 2 is an emission spectra of $Ce:Y_3Al_5(O,F)_{12}$ with fluorine concentrations ranging from about 1 to about 8 percent substitution for oxygen, the figure showing an increase in peak intensity as the F concentration is increased.
Figure 3:
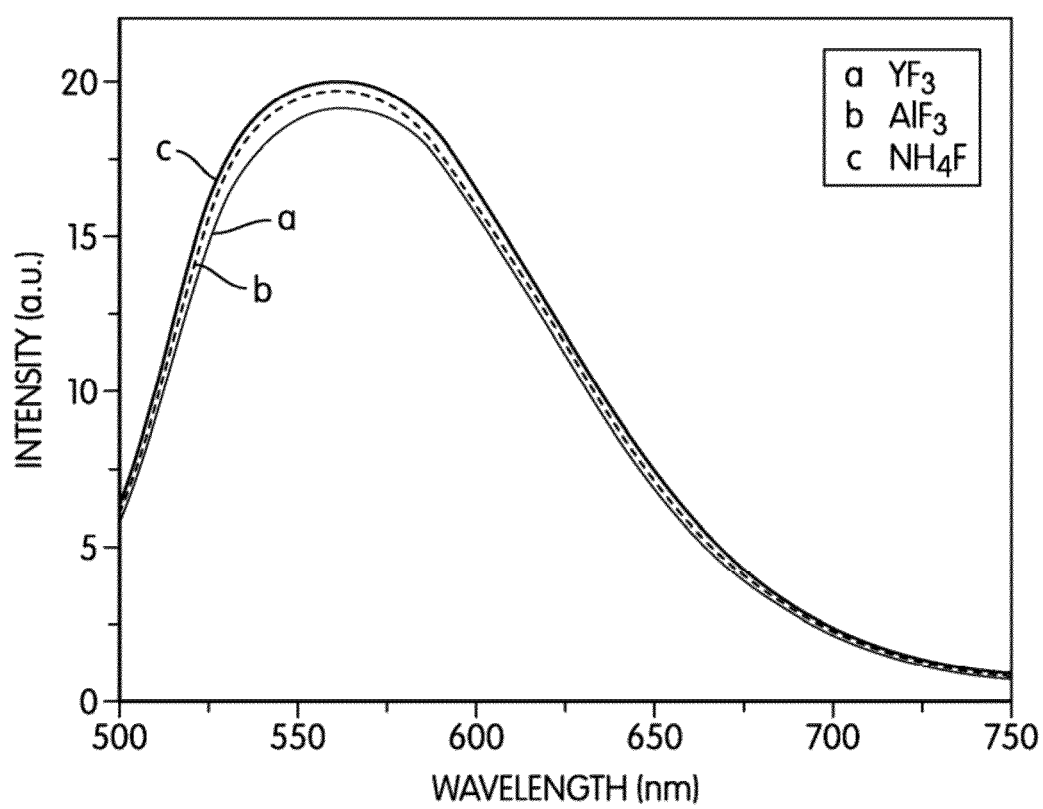
FIG. 3 is an emission spectra of a $Ce:Y_3Al_5(O,F)_{12}$ family of compounds, the variable in this experiment being the particular the fluorine-containing compound used as a starting material.

The results of these experiments are shown in FIGS. 1-3. FIG. 1 shows a collection of emission spectra from a family of compounds having the formula Ce:$Y_3Al_5(O,F)_{12}$, where the concentrations of the fluorine (F) were 0, 1, 3, 5, and 8 percent. These curves have been normalized, to illustrate the effect the increase in fluorine concentration has on the peak emission wavelength. As the fluorine concentration was increased from about 1 to about 8 percent, the phosphor demonstrated a shift in the peak emission wavelength to shorter wavelengths. This data confirms that fluorine is substituting for oxygen, a concept that will be discussed in more detail shortly.

The same collection of emission spectra from a Ce:$Y_3Al_5(O,F)_{12}$ series of phosphors is shown in FIG. 2, with again the fluorine concentrations ranged from about 1 to about 8 percent, but this time the data was not normalized to show the effect of the fluorine on photoluminescent intensity. This figure illustrates how an increase in peak intensity results from an increase in the F concentration, and again it is believed that this is a direct result of fluorine substituting for oxygen atoms in the lattice of the crystal. Thus, the F inclusion appears to have two effects.

The question of whether or not the source of the fluorine affected luminescent properties was investiged in FIG. 3. This figure shows the emission spectra of a Ce:$Y_3Al_5(O,F)_{12}$ family of compounds, the variable in this experiment being the particular the fluorine-containing compound used as a starting material. The type of fluorine-containing starting material did not seem to have an appreciable effect on optical properties, although the starting materials $YF_3$ did appear to produce a phosphor with slightly reduced intensities relative to the phosphors produced with starting materials $AlF_3$ and $NH_4F$.

The data of FIGS. 1 and 2 show that the emission peak intensity increases dramatically when the fluorine content is as small as 1 percent. Simultaneously, the emission peak wavelength shifts to short wavelength as the F concentration is increased. These results are attributed to the fluorine having been inserted into the crystal lattice as a result of the liquid processing, and it is contemplated that this insertion may be either of a substitutional or interstitial nature. If the insertion is substitutional, it is probable that the fluorine occupies $O^{2-}$ position in the lattice. If this is the case, then the presence of oxygen site vacancies may also be present from charge balance considerations.

Further study of the data reveals that the effects on wavelength and intensity are most apparent at fluorine concentrations less than about 5 atomic percent. When the amount of fluorine is greater than about 5 percent, cation vacancies become saturated, and the fluorine-containing starting compounds behave more as a solid state reaction flux than a liquid component.

Figure 4:
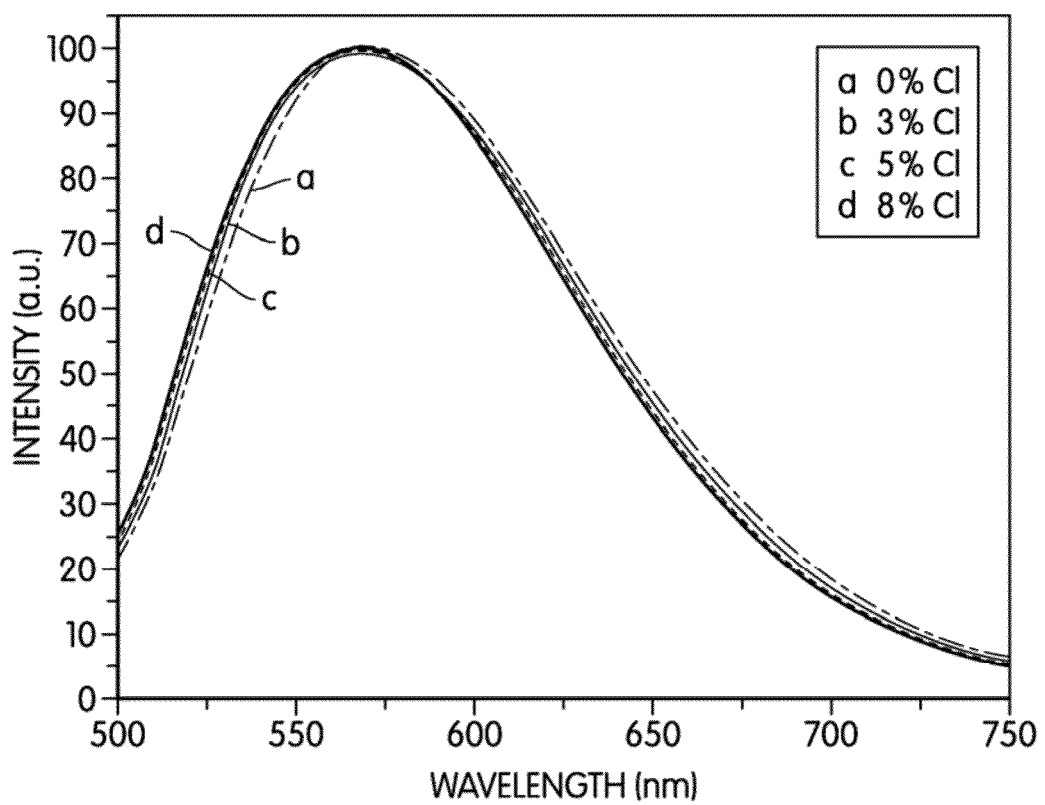
FIG. 4 is a collection of normalized emission spectra from $Ce:Y_3Al_5(OCl)_{12}$ doped with different Cl concentrations, the data showing that emission peak wavelength remains substantially the same at different levels of Cl doping.

A comparison of chlorine was made to fluorine in a separate set of experiments whose results are shown in FIG. 4. Similar to the manner in which the $F^-$ anion behaves, small quantities of $Cl^-$ may also function as flux in a Ce:YAG production process. Unlike the $F^-$ situation, where the fluorine anion may substitutionally replace the $O^{2-}$ anion, and become incorporated into the YAG lattice, thus influencing the the crystal field of the material and shifting the peak emission wavelength of the $Ce^{3+}$ in YAG host, the $Cl^-$ anion does not appear have the ability to occupy $O^{2-}$ positions. This may be because $Cl^-$ with its ionic radius of 1.81 Å is much larger than the $O^{2-}$ radius of 1.40 Å, while $F^-$, with its ionic radius of 1.33 Å, is just about the same size as the $O^{2-}$ anion.

Replacement of Al by Si in a Ce:YAG Type Phosphor

Figure 5:
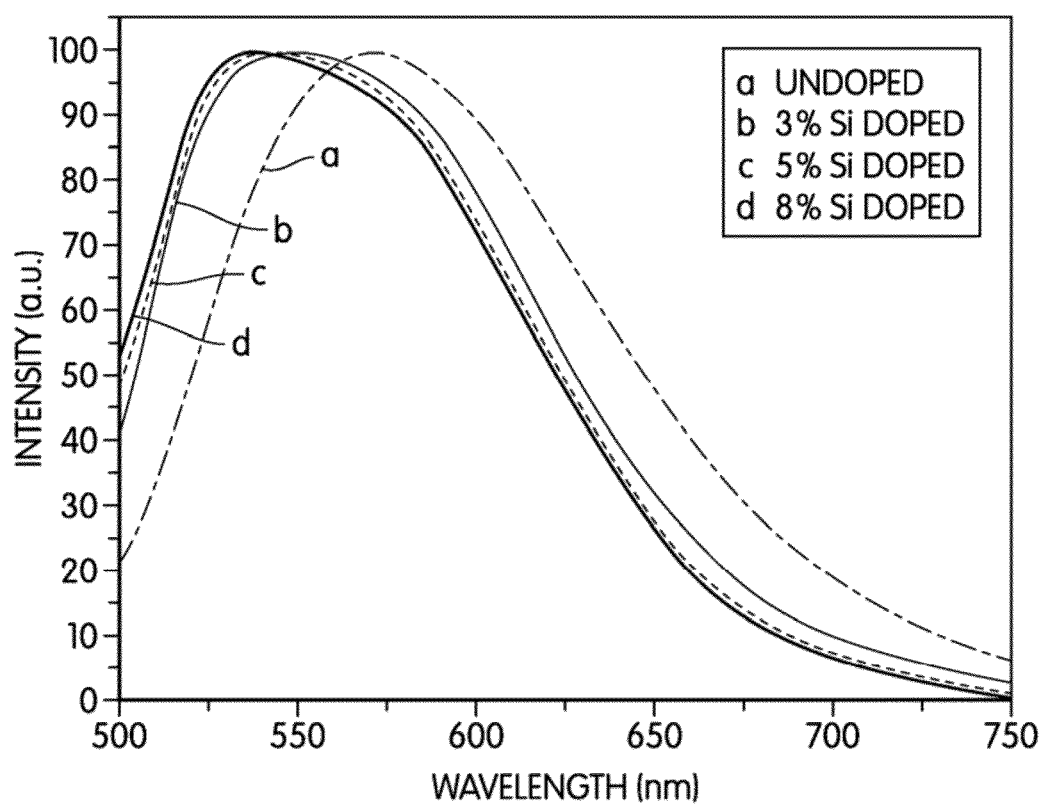
FIG. 5 is a collection of normalized emission spectra from a $Ce:Y_3(Al_{1-x}Si_x)_5O_{12}$ family of compounds where x varies from 0 to 0.08; this data shows that the peak wavelength shifts to shorter wavelengths (higher energies) as the silicon concentration is increased.

Small quantities of Si was added to the starting solution to form a phosphor having the general formula Ce:$Y_3(Al_{1-x}Si_x)_5O_{12}$. The results of this experiment are shown in FIG. 5. Here, the peak emission wavelength of the phosphor when x=0; that is to say, when there is no substitution of Al by Si, is at about 575 nm. Doping levels of 3, 5, and 8 percent shift the peak emission wavelength to shorter wavelengths, 550 nm or less, and each of these compositions are more or less centered at this position.

Sintering Temperature

Figure 6:
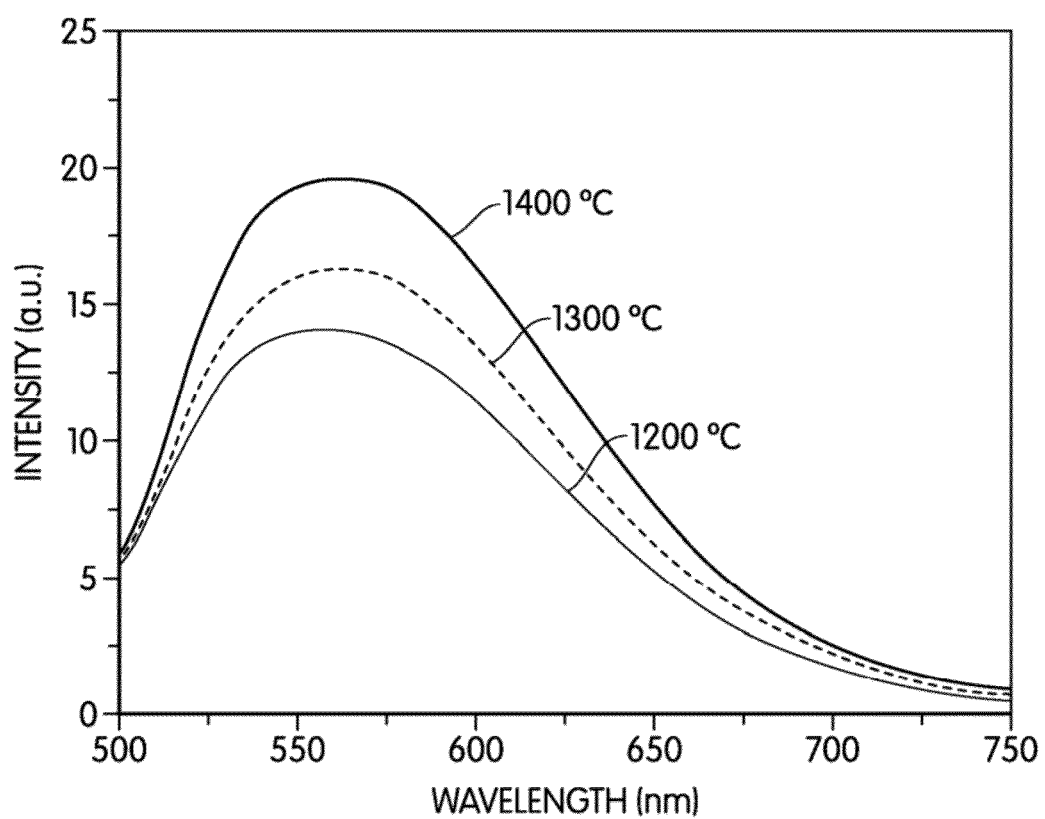
FIG. 6 shows the emission spectra of $Ce:Y_3Al_5O_{12}$ sintered at different temperature in a 5% $H_2$ atmosphere: the emission peak intensity increased as the sintering temperature was increased.
Figure 7:
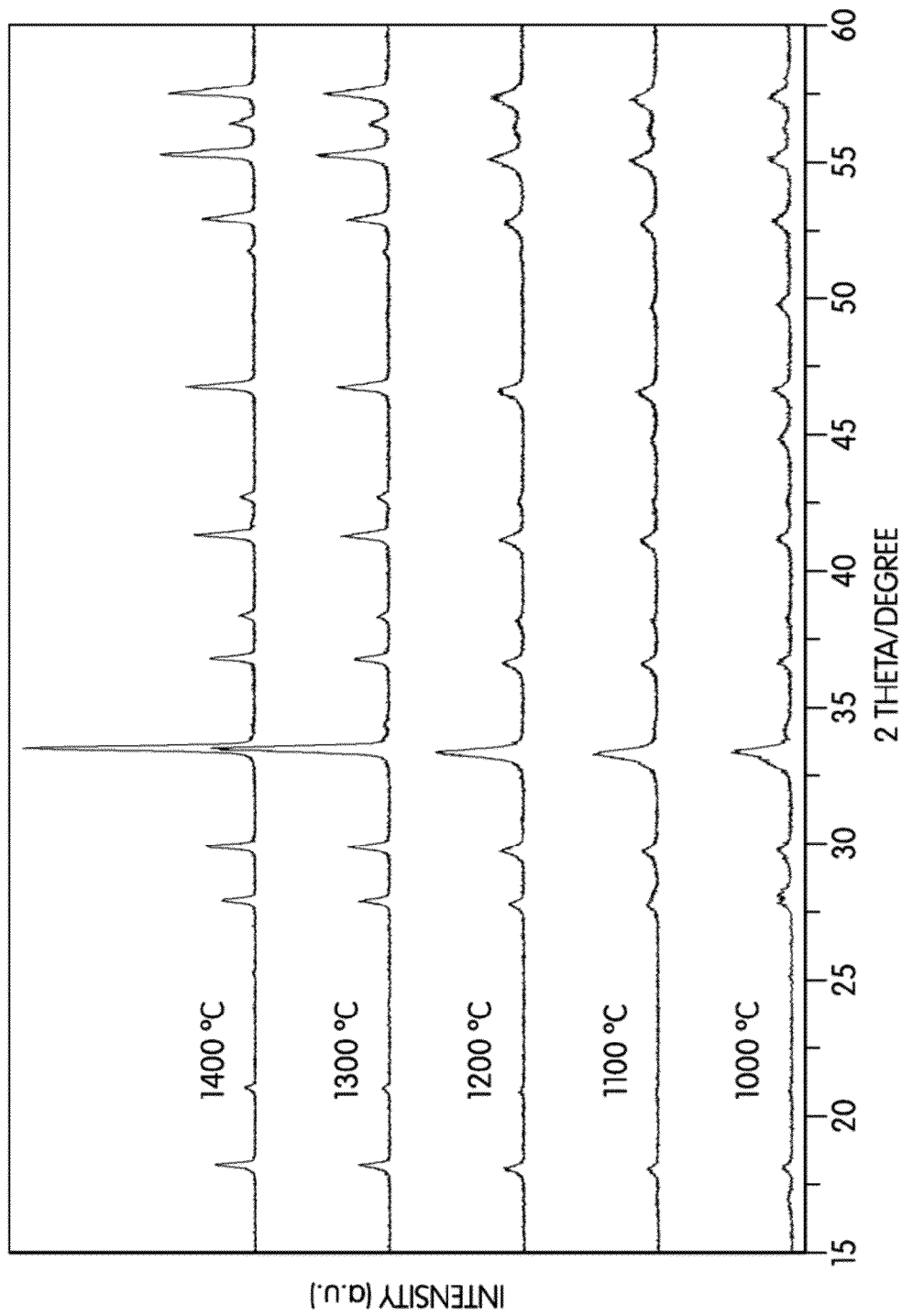
FIG. 7 shows x-ray diffraction (XRD) patterns of $Ce:Y_3Al_5O_{12}$ sintered at different temperature in 5% $H_2$ atmosphere: crystallinity improves as the sintering temperature is increased.

The effects of sintering temperature are shown in FIG. 6. The results show that emission intensity increases substantially with an increase in sintering temperature, from 1200° C. to 1300° C. to 1400° C., possibly because the higher the sintering temperature, the higher the purity of the YAG crystal that is formed. Furthermore, though not wishing to be bound by any particular theory, it is believed that accompanying the higher sintering temperature is a more homogeneous distribution of $Ce^{3+}$ within the YAG lattice. The improved crystallinity is shown by the x-ray diffraction patterns of FIG. 7, where the homogeneous distribution of $Ce^{3+}$ in the YAG lattice is at least one reason for the increase in emission intensity.

Sintering Atmosphere

Figure 8:
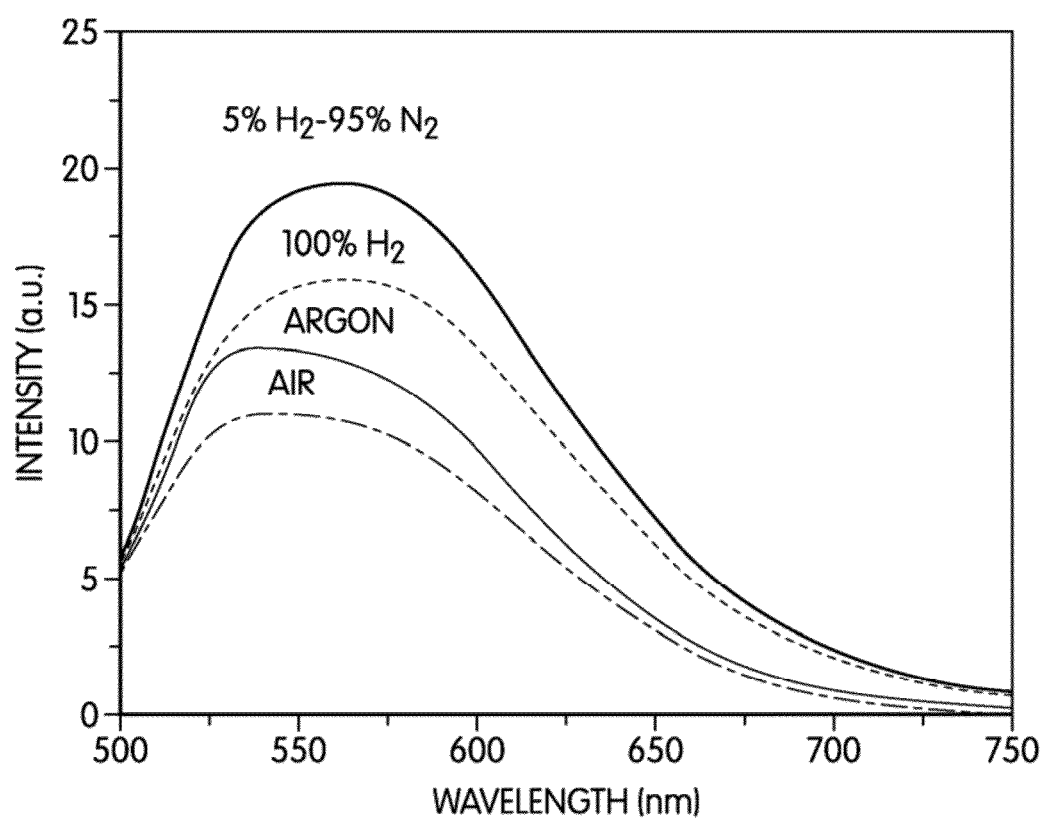
FIG. 8 is an emission spectra of $Ce:Y_3Al_5O_{12}$ sintered at the same temperature (1400° C.), but with varying atmospheres, showing that a 5% concentration of $H_2$ is the best sintering atmosphere for producing Ce:YAG.

The effect of sintering atmosphere is shown in FIG. 8. The results show a substantial increase in photoluminescent intensity as the sintering atmosphere is changed from air, which is of course nitrogen and oxygen, to argon, which is totally inert, to a 100 percent hydrogen atmosphere, to a reducing atmosphere of about 5 percent hydrogen and 95 percent nitrogen. The shape of the air and argon curves are different from those of the reducing atmospheres 100 percent hydrogen and 5 percent hydrogen-95 percent nitrogen, which is attributed to the fact that some of the $Ce^{3+}$ is being oxidized to $Ce^{4+}$.

Particle Size

Figure 9A:
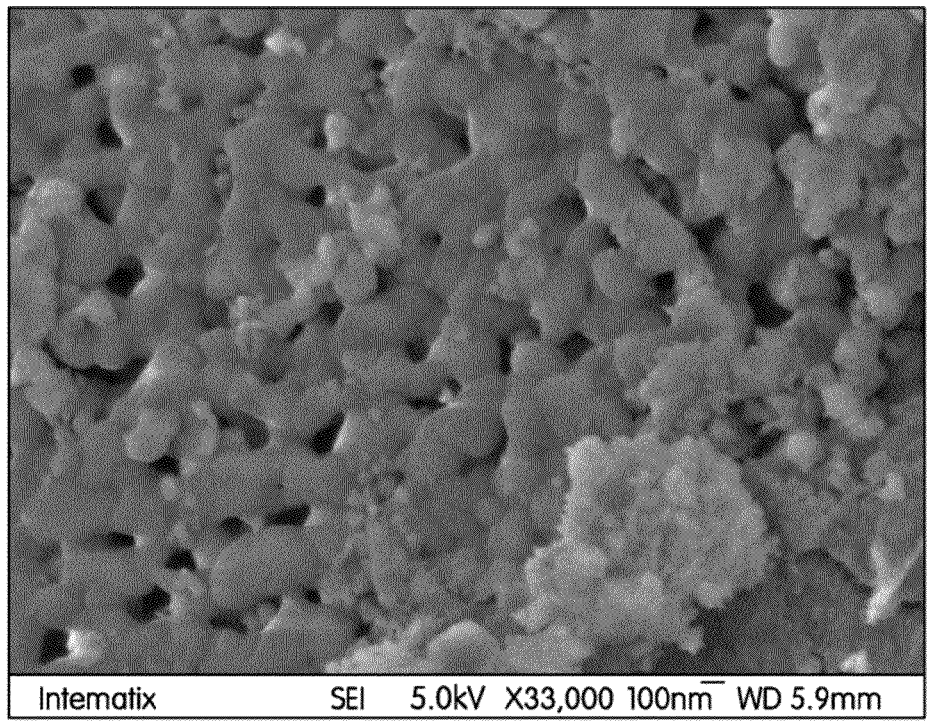
FIGS. 9A and 9B are scanning electron microscope (SEM) micrographs of a Ce:YAG compound prepared both by a co-precipitation method and by a solid-state-reaction technique; the primary particle size of the as-prepared phosphor using the co-precipitation method is about 200 nm with a narrow distribution.
Figure 9B:
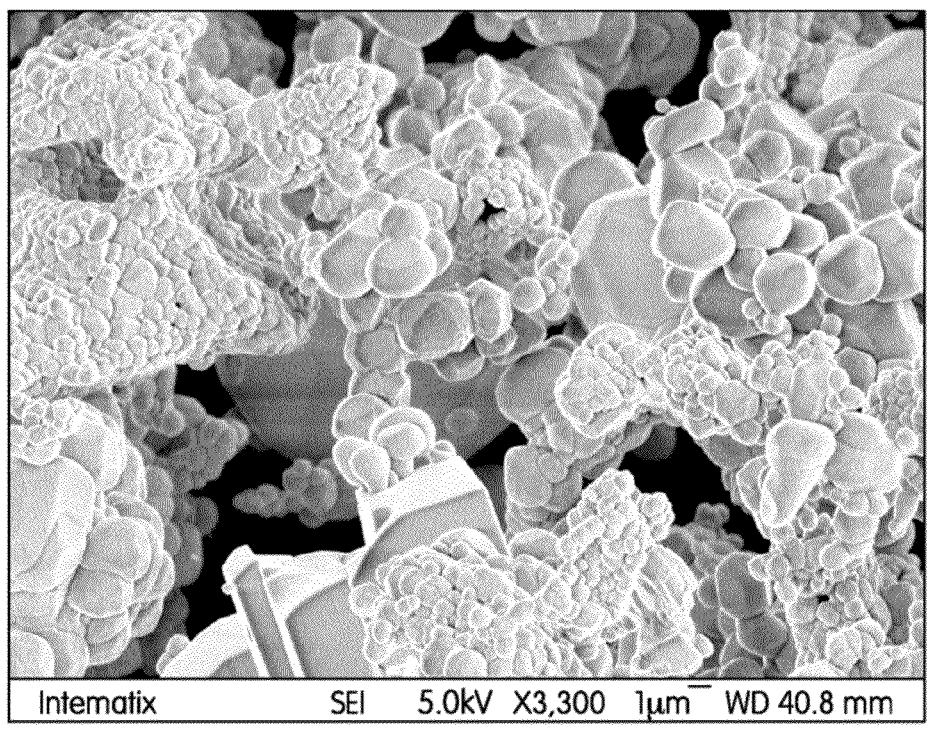

A goal of many phosphor production methodologies to produce a uniform particle size, something that is readily achievable using the instant co-precipitation methods. An exemplary particle size distribution that was observed with the instantly prepared phosphors was about 200 nm to 300 nm. This is a relatively narrow distribution, as the SEM pictures in FIG. 9A (co-precipitation) show compared to FIG. 9B (solid state reaction).

What is claimed is:

1. A cerium-doped, garnet-based phosphor comprising yttrium, aluminum, silicon, and oxygen, wherein the phosphor is configured to absorb excitation radiation having a peak wavelength ranging from about 445 nm to about 460 nm, and to emit light having a peak emission wavelength ranging from about 530 nm to about 550 nm, wherein the phosphor further includes a halogen.

2. The cerium-doped, garnet-based phosphor of claim 1, wherein the phosphor is doped with about 3% silicon.

3. The cerium-doped, garnet-based phosphor of claim 1, wherein the phosphor is doped with about 5% silicon.

4. The cerium-doped, garnet-based phosphor of claim 1, wherein the phosphor is doped with about 8% silicon.

5. The cerium-doped, garnet-based phosphor of claim 1,wherein the silicon substitutes for aluminum in the range from about 3% to about 8%.

6. A cerium-doped, garnet-based phosphor comprising a compound having the formula $Y_3(Al_{1-x}Si_x)_5O_{12}$:$Ce^{3+}$, where x ranges from about 0.03 to about 0.08, and wherein the phosphor is configured to emit light having a peak emission wavelength ranging from about 530 nm to about 550 nm, and wherein the phosphor further includes a halogen.

7. A cerium-doped, garnet-based phosphor comprising a compound having the formula $Y_3(Al_{1-x}Si_x)_5(O_{1-y}C_y)_{12}:Ce^{3+}$, where
- C is at least one of F or Cl;
- x ranges from about 0.001 to about 0.2;
- y ranges from about 0.001 to 0.2; and
- wherein the phosphor is configured to emit light having a peak emission wavelength ranging from about 540 nm to about 560 nm.

8. The cerium-doped, garnet-based phosphor of claim 7, wherein C is F.

9. A method of producing a phosphor having the formula $Y_3(Al_{1-x}Si_x)_5O_{12}:Ce^{3+}$, where x ranges from about 0.001 to about 0.2, and where the method comprises:
1) dissolving desired amounts of $Ce(NO_3)_3 \cdot 6H_2O$, $Y(NO_3)_3 \cdot 6H_2O$, $Al(NO_3)_3 \cdot 9H_2O$ in de-ionized water to form a solution and adding a halogen containing compound to the solution;
2) adding $(CH_3O)_4Si$ to the solution resulting from step 1);
3) adding the solution from step 2) to an ammonia solution in a dropwise manner;
4) aging the solution of step 3) for about 1 hour, and then filtering and washing the resultant precipitant with distilled water;
5) drying the precipitate of step 4) at about 150° C. for about 6 hours; and
6) cooling and gently milling the dried precipitate of step 4), transferring this product to an alumina crucible, and sintering the milled product at about 1100° C. to 1500° C. in a reducing atmosphere.

10. A cerium-doped, garnet-based phosphor comprising a compound having the formula $(Y,A)_3(Al_{1-x}Ga_x)_5(O,C)_{12}:Ce^{3+}$, where x ranges from about 0.001 to 1.0, A is selected from the group consisting of Tb, Gd, Sm, La, Sr, Ba and Ca where A substitutes for Y in amounts ranging from about 0.1 to 100 percent, C is selected from the group consisting of F, Cl, N and S where C substitutes for O in amounts ranging from about 0.1 to 100 percent, and wherein the phosphor includes a halogen.

11. The cerium-doped, garnet-based phosphor of claim 10, wherein the phosphor further includes silicon.

12. A cerium-doped, garnet-based phosphor comprising yttrium, aluminum, fluorine, and oxygen, wherein the phosphor is configured to absorb excitation radiation having a peak wavelength ranging from about 445 nm to about 460 nm, and wherein the peak emission wavelength is blue-shifted about 25 nm with the inclusion of 8% fluorine relative to no fluorine.

13. A cerium-doped, garnet-based phosphor comprising yttrium, aluminum, chlorine, and oxygen, wherein the phosphor is configured to absorb excitation radiation having a peak wavelength ranging from about 445 nm to about 460 nm, and wherein the peak emission wavelength is blue-shifted about 5 to 8 nm with the inclusion of 8% chlorine relative to no chlorine.

* * * * *